(12) United States Patent
Sako et al.

(10) Patent No.: US 6,616,295 B2
(45) Date of Patent: Sep. 9, 2003

(54) LIGHTING DEVICES FOR POWER TOOLS (75) Inventors: Masahiko Sako, Anjo (JP); Toshio Matsumoto, Anjo (JP); Akihito Hara, Anjo (JP)

(73) Assignee: Makita Corporation, Anjô (JP)

( * ) Notice: Subject to any disclaimer, the term of this patent is extended or adjusted under 35 U.S.C. 154(b) by 0 days.

(21) Appl. No.: 09/987,308

(22) Filed: Nov. 14, 2001

(65) Prior Publication Data

US 2002/0057568 A1 May 16, 2002

(30) Foreign Application Priority Data

Nov. 16, 2000 (JP) ........................................ 2000-349968

(51) Int. Cl.[7] .............................................. F21V 21/14
(52) U.S. Cl. ............................ 362/119; 362/89; 82/520
(58) Field of Search ........................ 362/119, 89; 83/83, 83/520, 521, 471.3, 478, 490, 397

(56) References Cited

U.S. PATENT DOCUMENTS

| 2,525,588 A | * | 10/1950 | Cameron et al. | ........... 362/119 |
| 2,852,051 A | * | 9/1958 | Bickner | ........... 362/119 |
| 3,781,759 A | | 12/1973 | Shelly, Jr. | |
| 4,833,782 A | * | 5/1989 | Smith | ........... 362/119 |
| 4,887,193 A | * | 12/1989 | Dieckmann | ........... 362/89 |
| 5,169,225 A | * | 12/1992 | Palm | ........... 362/119 |
| 5,261,831 A | | 11/1993 | Vendal et al. | |
| 5,285,708 A | | 2/1994 | Bosten et al. | ........... 83/520 |
| 5,375,495 A | | 12/1994 | Bosten et al. | ........... 83/520 |
| 5,461,790 A | * | 10/1995 | Olstowski | ........... 362/119 |
| 5,518,053 A | * | 5/1996 | Robison | ........... 144/286.1 |
| 5,793,130 A | * | 8/1998 | Anderson | ........... 362/119 |
| 5,797,670 A | * | 8/1998 | Snoke et al. | ........... 362/119 |
| 5,996,460 A | * | 12/1999 | Waite | ........... 83/520 |
| 6,418,322 B1 | * | 11/2002 | Hsiung | ........... 83/521 |
| 6,497,168 B1 | * | 12/2002 | Levine | ........... 83/520 |

FOREIGN PATENT DOCUMENTS

| DE | 29 709 437 | 9/1997 |
| GB | 2120879 | 12/1983 |
| JP | 11-170203 | 6/1999 |
| JP | 11-191304 | 7/1999 |
| WO | 99/22310 | 1/1999 |

* cited by examiner

Primary Examiner—Laura K. Tso
(74) Attorney, Agent, or Firm—Dennison, Schultz & Dougherty (57) ABSTRACT A lighting device includes a mount adapted to be attached to a power tool. A flexible support extends from the mount and permits the lighting device to be oriented in any desired direction. A fluorescent lamp is mounted on the flexible support opposite to the mount. An electric circuit serves to light the fluorescent lamp and includes an inverter circuit.

26 Claims, 6 Drawing Sheets

LIGHTING DEVICES FOR POWER TOOLS

This application claims priority to Japanese application serial number 2000-349968, which application is hereby incorporated by reference herein in its entirety.

BACKGROUND OF THE INVENTION

1. Field of the Invention

The present invention relates to lighting devices that may be used in combination with power tools, such as circular saws.

2. Description of the Related Art

Circular saws are known that have lights for illuminating a portion of a workpiece (in particular, the portion of the workpiece that is being cut by a cutting edge of a circular saw blade) during the cutting operation, so that the cutting operation can be performed at night or in a dark area.

However, known circular saws incorporate incandescent lamps as the light source. Generally speaking, incandescent lamps include tungsten filaments that are heated in order to emit light. Such tungsten filaments tend to break due to vibration of the circular saw during the cutting operation and thus, may have a relatively short lifetime.

SUMMARY OF THE INVENTION

It is, accordingly, one object of the present invention to teach improved lighting devices for use with power tools. For example, in one aspect of the present teachings, the lighting devices have excellent durability over known incandescent lamps.

In one embodiment of the present teachings, lighting devices may include a fluorescent lamp. The fluorescent lamp may be supported on a power tool by means of a flexible support, so that the position of the fluorescent lamp relative to the power tool can be set or moved to desired positions. Power may be supplied to the fluorescent lamp by means of a power supply circuit that has an inverting function.

Preferably, a mount or mounting device is utilized to attach the flexible support to the power tool. The power supply circuit may include a circuit board on which an inverter circuit is assembled. The circuit board may be attached to the mount. Further, the mount may substantially closely encapsulate the circuit board.

In another aspect of the present teachings, circular saws are taught that include the lighting devices having the above features.

Additional objects, features and advantages of the present invention will be readily understood after reading the following detailed description together with the accompanying drawings and the claims.

DETAILED DESCRIPTION OF THE INVENTION

In one embodiment of the present teachings, lighting devices are taught that may include a mount that is adapted to attach the lighting device to a power tool. A flexible support may extend from the mount and may be oriented in any direction. A fluorescent lamp may be attached to one end of the flexible support, which end of the flexible support is opposite to the mount. The lamp may be controlled by an electric circuit that includes an inverter circuit.

Fluorescent lamps naturally have a long lifetime and have a higher resistance to vibrations. In addition, fluorescent lamps may naturally provide an illumination range that is broader than known incandescent lamps. Therefore, the portion of the workpiece that will be cut can be effectively illuminated using the present lighting devices.

In addition, because the inverter circuit controls the fluorescent lamp, light flickering can be reduced. Therefore, the lamp can effectively illuminate the workpiece during the operation of the power tool.

Further, the lamp can illuminate either side, such as the left or right side, of the workpiece by appropriately bending the flexible support. Therefore, the power tool can be effectively operated. Furthermore, both right-handed and left-handed operators can easily illuminate and inspect the portion of the workpiece that is being cut or machined by the tool during the cutting or machining operation.

In a more preferred embodiment, the mount may be disposed adjacent to a handle of the power tool and the inverter circuit may be assembled into the mount.

Therefore, the structure of the flexible support on the side of the fluorescent lamp may be simplified compared to an arrangement in which the inverter circuit is disposed adjacent to the fluorescent lamp. As a result, the lighting device can be incorporated into the power tool without deteriorating the operability of the tool.

Further, an ON/OFF switch may be disposed on the mount, so that the operator can operate the switch while grasping the handle with the same hand. Therefore, the operability of the tool can further be improved.

In another aspect of the present teachings, circular saws are taught that include the lighting devices according to the present teachings.

In another preferred embodiment, circular saws may include a saw unit that has a circular saw blade. The fluorescent lamp may be mounted on the saw unit and the flexible support may support the fluorescent lamp with respect to the saw unit. Therefore, the fluorescent lamp can be positioned in any desired position relative to the saw unit.

In another embodiment, a table may support the saw unit, so that the saw unit can move toward and away from the table. Further, the saw unit can incline relative to the table so as to vary the inclination angle of the circular saw blade relative to a workpiece. Preferably, the flexible support may illuminate either side of the saw blade, and further illuminate the portion of the workpiece that is being cut by the saw blade. The mount for the flexible support may be attached to the saw unit.

Preferably, a handle may be mounted on the saw unit and may be adapted to be grasped by an operator during a cutting operation. The mount may be attached to the handle, so that an operator can turn the lighting switch ON and OFF while grasping the handle during the cutting operation.

Each of the additional features and method steps disclosed above and below may be utilized separately or in conjunction with other features and method steps to provide improved lighting devices and methods for designing and using such lighting devices. Representative examples of the present invention, which examples utilize many of these additional features and method steps in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention. Moreover, various features of the representative examples and dependent claims may be combined in ways that are not specifically enumerated in order to provide additional useful embodiments of the present teachings.

A representative embodiment of a lighting device will now be described with reference to FIGS. 1 to 6. A representative lighting device 1 may be mounted on a circular table saw 10.

The circular table saw 10 may generally comprise a turntable 11, a support 12 and a saw unit 20. A workpiece (not shown) to be cut may be placed on the turntable 11. The support 12 may be disposed on the rear portion of the turntable 11 and can pivot in the right and left directions as viewed in FIG. 2. The saw unit 20 may be mounted on the upper end of the support 12, so that the saw unit 20 can vertically pivot relative to the support 12. Further, the saw unit 20 can pivot laterally relative to the turntable 11. The saw unit 20 may include an electric motor 21, a circular saw blade 22 that is rotatably driven by the electric motor 21, and a handle 23 that can be grasped by an operator in order to vertically pivot the saw unit 20. A blade case 24 may cover substantially the upper half of the saw blade 22. A blade cover 25 may cover and uncover substantially the lower half of the saw blade 22. Thus, the blade cover 25 may rotate to uncover the saw blade 22 in response to downward pivotal movement of the saw unit 20. On the other hand, the blade cover 25 may rotate in an opposite direction to cover the saw blade 22 in response to upward movement of the saw unit 20.

Figure 6:
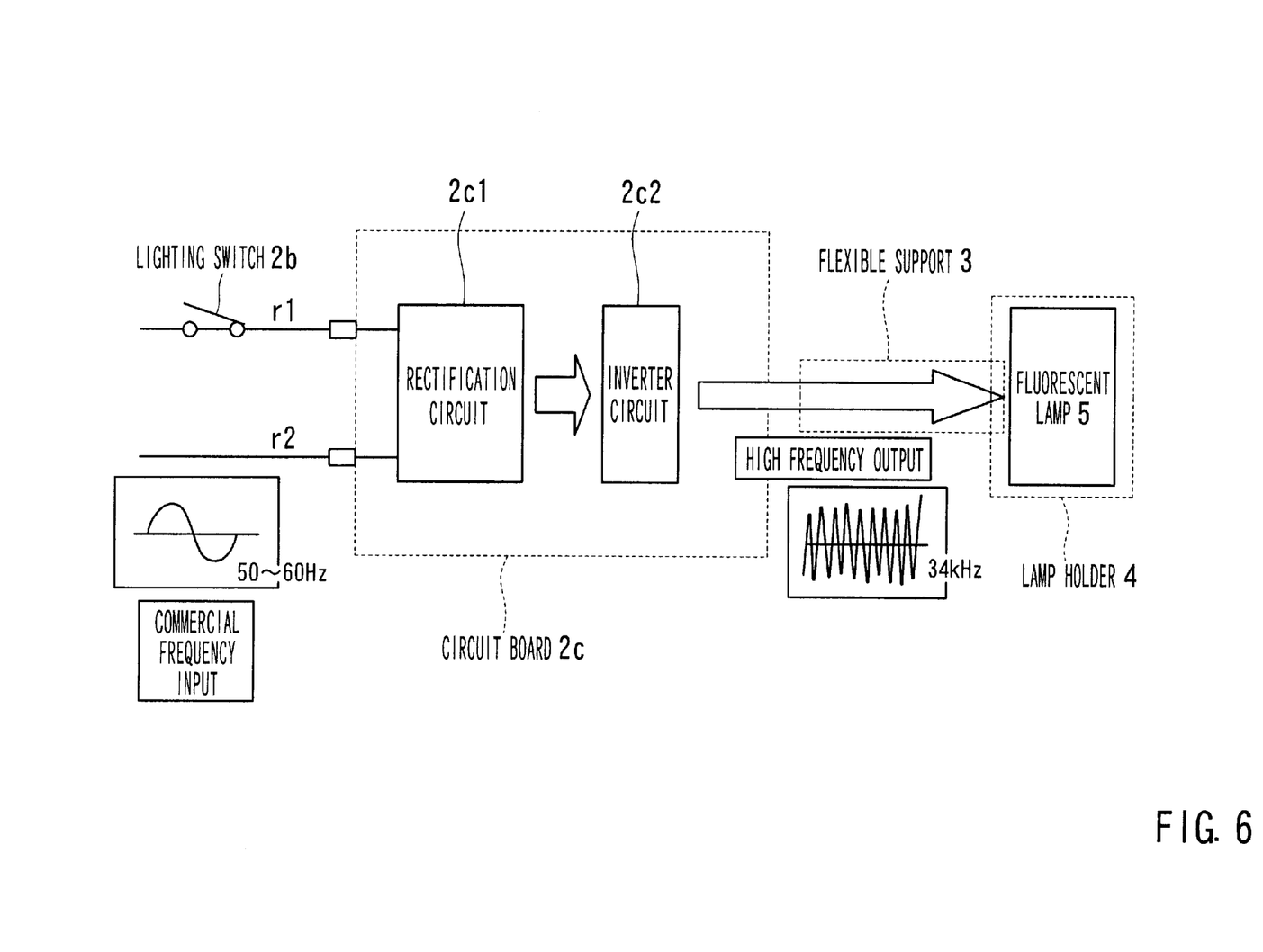
FIG. 6 is a schematic diagram of the representative lighting circuit.

Preferably, the lighting device 1 may be mounted on the handle 23 and may include a mount 2 that is secured to one side surface of the handle 23. A flexible support 3 may extend from the mount 2. A lamp holder 4 may be attached to a first end of the flexible support 3, which first end is opposite to the mount 2. A fluorescent lamp 5 may be removably received within the lamp holder 4. The fluorescent lamp 5 is preferably operated by an electrical circuit that may include a rectifier circuit 2c1, an inverter circuit 2c2 and a lighting switch 2b as shown FIG. 6. FIG. 6 shows a schematic diagram of a representative electric circuit. The representative electric circuit may be connected to an AC power source (not shown) by means of electric lines or wires r1 and r2. The power source may also supply power to the electric motor 21 of the saw unit 20.

Figure 1:
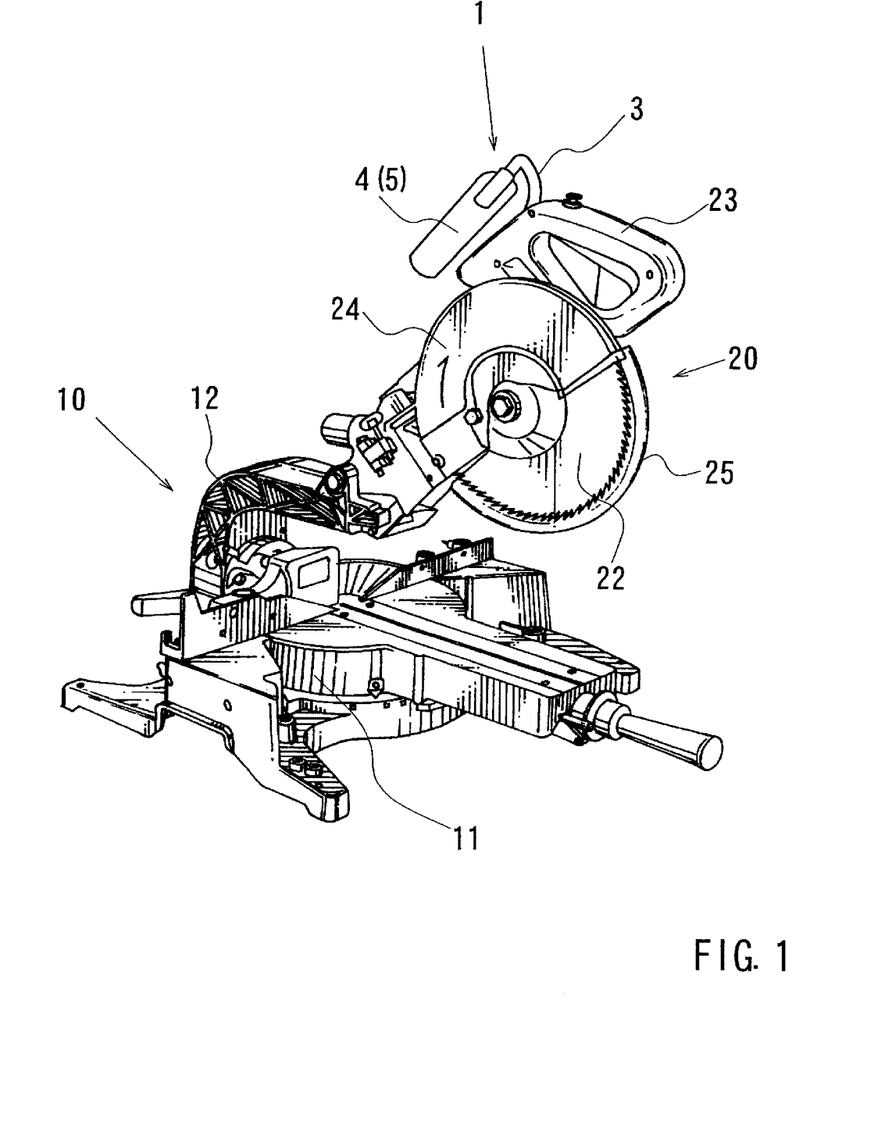
FIG. 1 is a perspective view of a circular table saw incorporating a representative lighting device.
Figure 2:
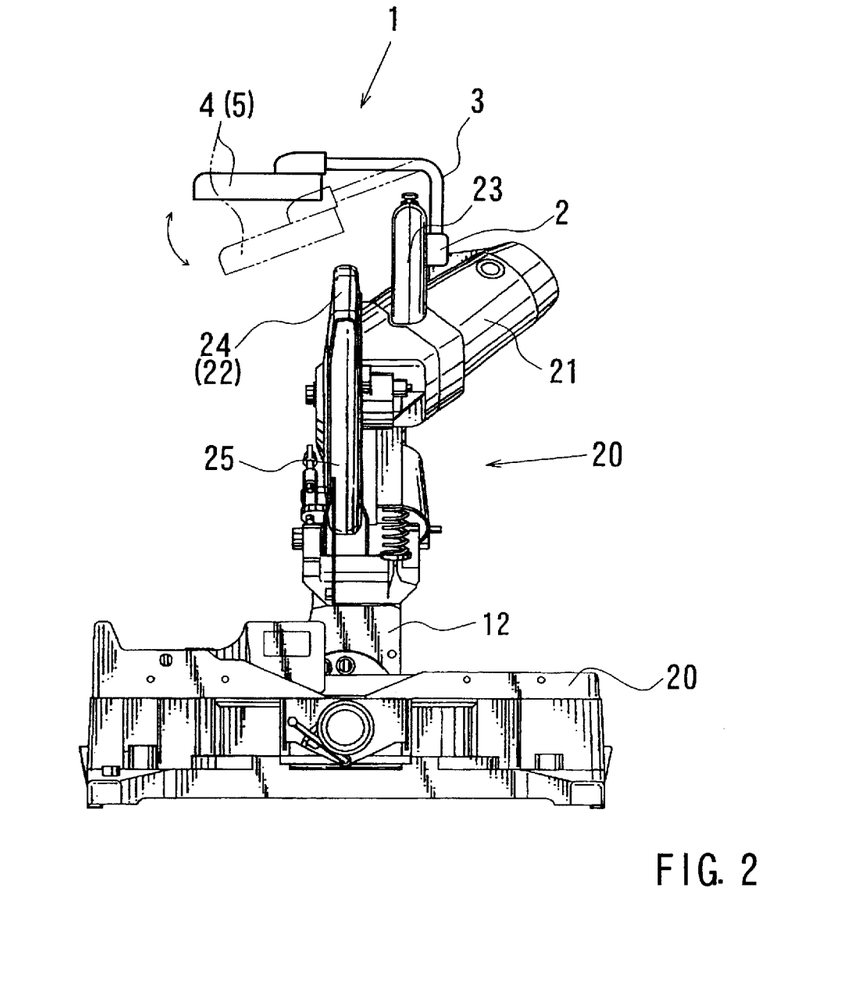
FIG. 2 is a front view of the circular table saw.
Figure 3:
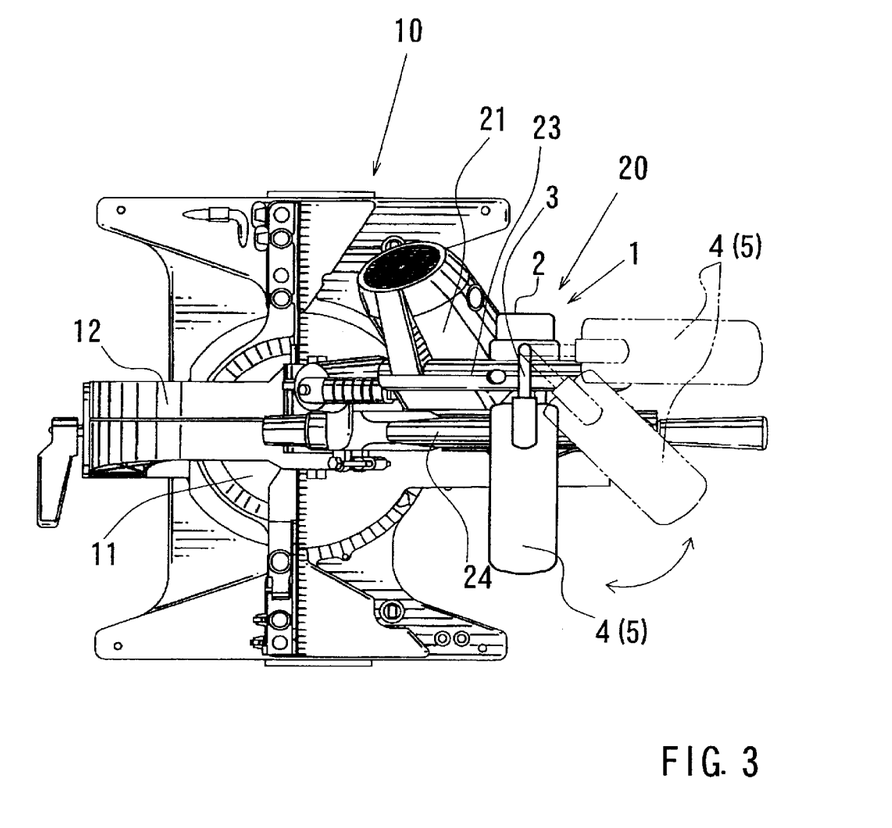
FIG. 3 is a plan view of the circular table saw.
Figure 4:
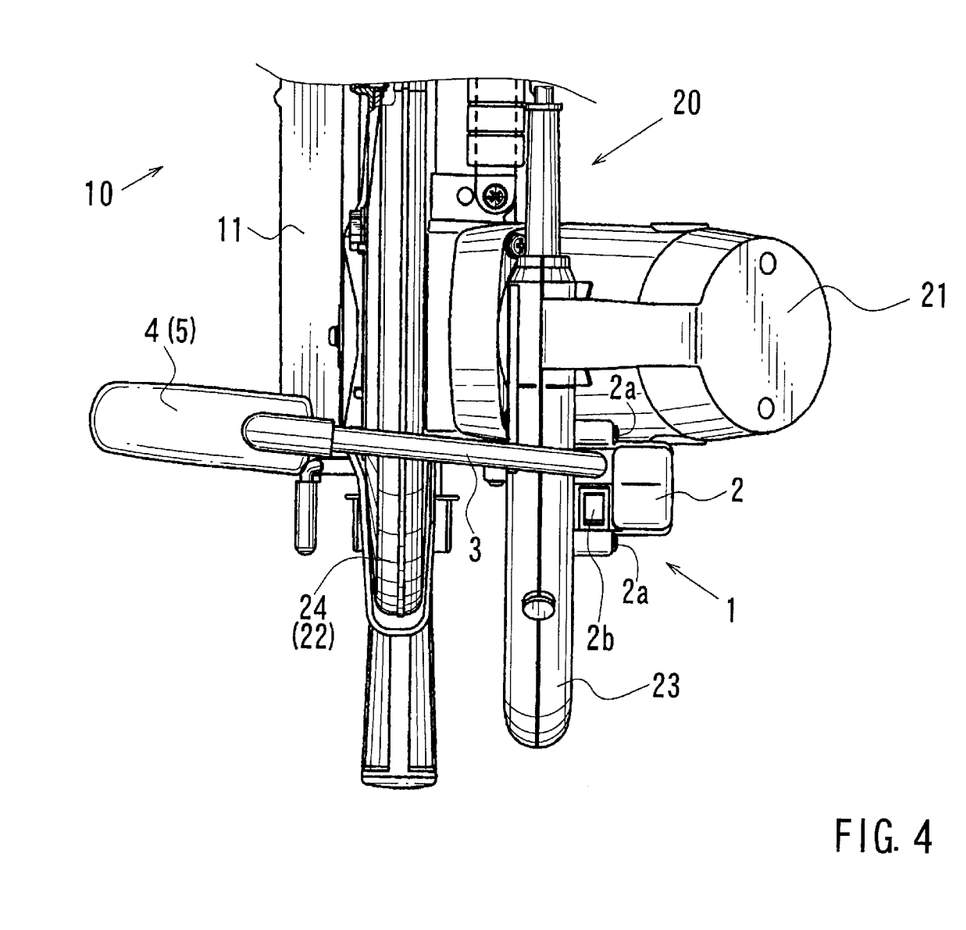
FIG. 4 is an enlarged plan view of a mount of the representative lighting device.
Figure 5:
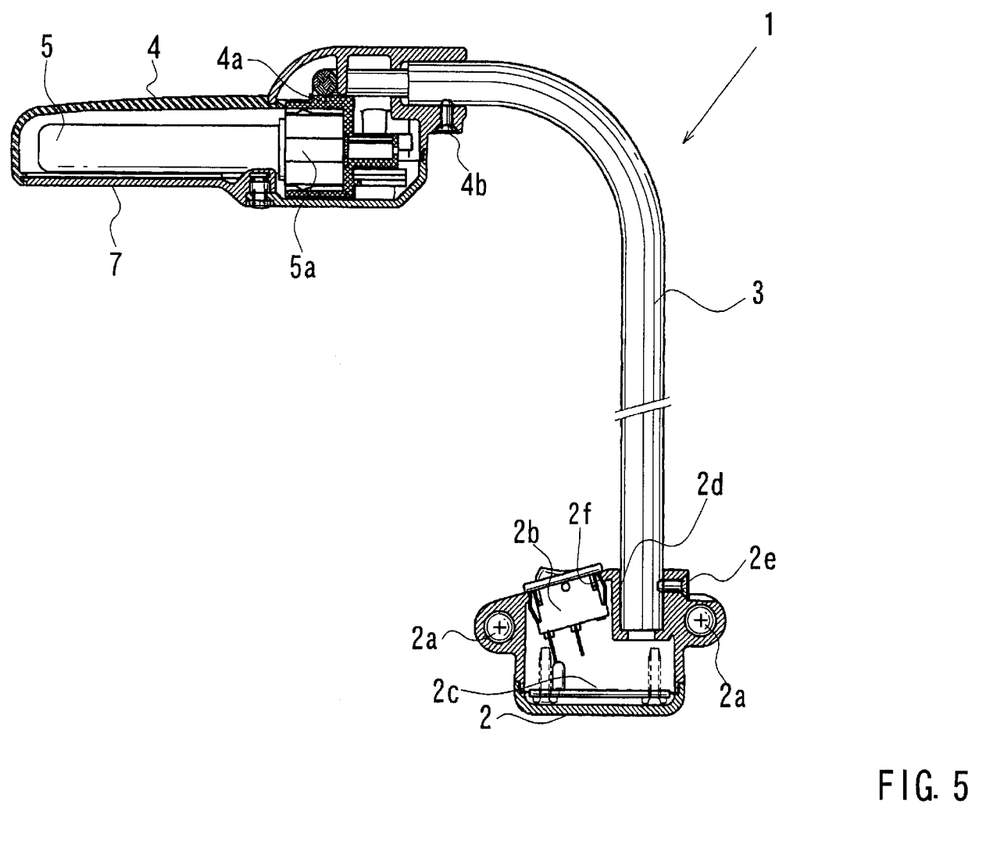
FIG. 5 is a partial, sectional side view of the representative lighting device.

As shown in FIGS. 2 to 4, the mount 2 may have a box-shaped configuration and may be secured to one lateral side of the handle 23 by means of screws 2a. As shown in FIG. 5, a circuit board 2c may be secured to the bottom of the mount 2, and the rectifier circuit 2c1 and the inverter circuit 2c2 may be assembled onto the circuit board 2c. The lighting switch 2b may be mounted within an upper opening 2f of the mount 2. A circular recess 2d may be formed in the upper surface of the mount 2, so that a second end (i.e., the lower end as viewed in FIG. 5) of the flexible support 3 may be inserted into the circular recess 2d and may be fixed in position by means of a fixing screw 2e.

Preferably, the flexible support 3 may be a hollow pipe that has a bellows-like structure. Therefore, the flexible support 3 may be freely bent in any desired direction. As a result, the first end of the flexible support 3 may be directed in any desired direction. Thus, although the flexible support 3 shown in FIG. 5 is bent in a substantially inverted L-shaped configuration, it may be bent in a U-shaped configuration or may have a linear configuration. The electrical circuit may include electrical lines, wires or connectors (not shown) that extend from the circuit board 2c to the fluorescent lamp 5 via the interior of the flexible support 3.

The lamp holder 4 may be fixedly attached to the first end of the flexible support 3 by means of a screw 4b. A receptacle 4a may be mounted within the lamp holder 4 and may be connected to the electrical lines (connectors). The fluorescent lamp 5 may have an elongated configuration and may have a lamp base 5a disposed at one end. The lamp base 5a may be inserted into the receptacle 4a so as to be electrically connected to the receptacle 4a.

Preferably, the fluorescent lamp 5 may be substantially entirely covered by the lamp holder 4, so that foreign particles, such as cutting chips, may not enter the lamp holder 4.

The lamp holder 4 may have a transparent cover 7 on one side opposite to the lateral side of the fluorescent lamp 5.

Preferably, the position of the lighting switch 2b may be chosen such that the operator's fingers can reach the lighting switch 2b in order to turn the switch 2b ON and OFF while grasping the handle 23. When the fluorescent lamp 5 is turned ON, the operator can illuminate the portion of the workpiece that will be cut, even if the cutting operation is performed at night or in a dark room. Therefore, the cutting operation can be reliably and effectively performed. In addition, because the operator can turn the lighting switch 2b ON and OFF while holding the handle 23 during the cutting operation, the operability of the circular table saw also may be improved in this respect.

In addition, because the fluorescent lamp 5 naturally does not include filaments that could break due to vibration, a highly durable light source is provided by the present teachings. Furthermore, the illuminating range of the fluorescent lamp 5 may be broader than the illumination range of known incandescent lamps.

Because the electrical circuit includes the inverter circuit 2c2, light flickering may be reduced as compared to known fluorescent lamps. Therefore, the cutting operation can be comfortably performed without the distraction of a flickering light source.

The construction and operation of circuits that can be used to perform the functions of the rectifier circuit 2c1 and the inverter circuit 2c2 are well known in the art. Thus, the inverter circuit 2c2 need only be briefly explained with reference to FIG. 6. When the lighting switch 2b is turned ON, current from the power source (e.g., a commercial AC power source having a frequency of 50 or 60 Hz) will be coupled to the rectifier circuit 2c1 via the electrical lines or connectors r1 and r2. The rectifier circuit 2c1 preferably converts an alternating current (AC) into a direct current (DC). For example, the rectifier circuit 2c1 may include a bridge rectifier or full-wave rectifier according to known techniques. Further, the rectifier circuit 2c1 may include a rectifier filter circuit in order to smooth the direct current output from the rectifier circuit 2c1. Diodes may be preferably utilized in the bridge or full-wave rectifier. Thereafter, the output from the rectifier circuit 2c1 is converted into an alternating current having a relatively high frequency (e.g., 34 kHz) by the inverter circuit 2c2. Thus, the inverter circuit 2c2 preferably converts the direct current (DC) supplied by the rectifier circuit 2c1 into an alternating current (AC) and may include switching elements (e.g., transistors). For example, a relaxation inverter circuit may be utilized for this purpose. The high frequency alternating current is then supplied to the fluorescent lamp 5.

Because the lamp holder 4 is supported by the flexible support 3 that can bend in any direction, the operator can manually move the lamp holder 4 in order to change the illumination area of the fluorescent lamp 5. For example, as shown in FIG. 3, the lamp holder 4 may be pivoted substantially within the same horizontal plane in order to illuminate the cutting portion of the workpiece from either the left side or the right side of the saw blade 22. Moreover, the lamp holder 4 may be moved upward in order to broadly illuminate the area (including the cutting portion of the workpiece) or may be moved downward in order to locally illuminate the cutting portion. Therefore, the present teachings provide a versatile lighting device 1.

Further, the circuit board 2c that includes the rectifier circuit 2c1 and the inverter circuit 2c2 is not required to be mounted on the lamp holder 4. Instead, the circuit board 2c may be mounted within the mount 2. Therefore, the lamp holder 4 may have a compact design and preferably does not obstruct the operation of the circular table saw 10. In addition, the representative electric circuit, in particular the circuit board 2c, does not require a transformer in order to reduce the power source voltage (e.g., 100V, 115V or 220V) to a lower voltage (e.g., 12 V), which transformer is required in known power supply circuits for incandescent lamps. Therefore, this feature also permits the lighting device 1 to have a compact design.

The above representative embodiment may be modified in various ways. For example, although the mount 2 for the flexible support 3 is disposed on the lateral side of the handle 23, such mount may be disposed on other parts of the table circular saw 10, such as a lateral surface of the blade case 24 or a lateral surface or an upper surface of the table 11. In addition, although the representative lighting device 1 is used for the table circular saw 10, it also may be used for the other power tools, such as portable circular saws, stationary circular saws, power drills, power screwdrivers and reciprocating saws.

Further, if the present lighting devices are utilized in a battery-powered power tool, the rectifier circuit 2c1 can be eliminated, because the battery will supply a direct current (DC). Therefore, the direct current from the battery can be supplied directly to the inverter circuit 2c2 in order to generate a relatively high frequency alternating current.

In the representative embodiment, the inverter circuit 2c2 generated an alternating current having a frequency of 34 kHz. However, alternating currents within the range of about 20–50 kHz also may be advantageously utilized with the present lighting devices.

Further, the rectifier circuit 2c1 also may be referred to as an AC-to-DC converter, because the essential function of the rectifier circuit 2c1 is to convert an alternating current (preferably from a commercial power supply) to a direct current. Furthermore, the inverter circuit 2c2 also may be referred to as a DC-to-AC converter, because the essential function of the inverter circuit is to convert a direct current (from the rectifier circuit 2c1 or from a battery) into an alternating current that will be utilized to operate the fluorescent lamp 5.

What is claimed is:

1. A power tool comprising:
   a fluorescent lamp,
   means for flexibly supporting the fluorescent lamp on the power tool, wherein the position of the fluorescent lamp relative to the power tool can be set or moved to any desired position and the flexible support means has a hollow tubular configuration that defines an inner space, and
   means for supplying power to the fluorescent lamp, the power supply means including converting means for converting a direct current into a relatively high frequency alternating current, the power supply means being electrically coupled to the fluorescent lamp via the inner space of the flexible support means.

2. A power tool as in claim 1, wherein the converting means generates an alternating current having a frequency of about 20–50 kHz.

3. A power tool as in claim 1, further comprising means for attaching the flexible support means to the power tool, the power supply means including a circuit board on which the converting means is assembled, and the circuit board being mounted on the attaching means.

4. A power tool as in claim 3, wherein the attaching means substantially closely encapsulates the circuit board.

5. A power tool as in claim 1, further comprising a switch for turning the fluorescent lamp ON and OFF, the switch being disposed in a position that permits the operator to easily operate the switch while operating the power tool.

6. A power tool as in claim 1, wherein the power tool is a circular saw having a handle, the fluorescent lamp being coupled to the handle.

7. A power tool as in claim 6, further comprising means for attaching the flexible support means to the circular saw, the power supply means including a circuit board on which the converting means is assembled, and the circuit board being mounted on the attaching means and the attaching means substantially and closely encapsulates the circuit board, wherein the converting means generates an alternating current having a frequency of about 20–50 kHz.

8. A power tool as in claim 7, further comprising a switch for turning the fluorescent lamp ON and OFF, the switch being disposed in a position that permits the operator to easily operate the switch while operating the circular saw.

9. A power tool as in claim 1, wherein the power tool is a circular saw comprising a table that supports a saw unit, wherein the saw unit can move toward and away from the table and the saw unit can incline relative to the table so as to vary the inclination angle of a workpiece supported by the table with respect to a circular saw blade disposed within the saw unit, the flexible support means being bendable to permit illumination of either side of the circular saw blade and a portion of the workpiece that will be cut by the circular saw blade.

10. A power tool as in claim 9, wherein the circular saw further includes a handle disposed on the saw unit and the fluorescent lamp is coupled to the handle via the flexible support means.

11. A power tool as in claim 10, wherein a first end of the flexible support means is attached to the handle via a mount, wherein the converting means is assembled onto a circuit board that is attached to the mount.

12. A power tool as in claim 11, wherein the converting means generates an alternating current having a frequency of about 20–50 kHz.

13. A power tool as in claim 1, further comprising a table supporting a saw unit, the saw unit being movable toward and away from the table and the saw unit being inclinable relative to the table so as to vary the inclination angle of a workpiece supported by the table with respect to the saw unit, the saw unit comprising a circular saw blade and the flexible support means being bendable to permit illumination of either side of the circular saw blade and a portion of the workpiece that will be cut by the circular saw blade.

14. A lighting device comprising:
   a mount arranged and constructed for mounting adjacent to a handle of a power tool;
   a flexible support extending from the mount, which permits the flexible support to be oriented in any desired direction;
   a fluorescent lamp mounted on the flexible support opposite to the mount; and
   a circuit board attached to the mount, the circuit board comprising an electric circuit arranged and constructed for lighting the fluorescent lamp, the electric circuit including a circuit that generates a relatively high frequency alternating current.

15. A power tool comprising a tool and a handle operably disposed to move the tool, wherein the lighting device and the mount of claim 14 are attached to the handle of the power tool.

16. A power tool as in claim 15, wherein the tool is a circular saw blade.

17. A lighting device as in claim 14, wherein the electric circuit further includes a lighting switch attached to the mount in a position that permits an operator to operate the lighting switch during a power tool operation in order to turn the fluorescent lamp ON and OFF.

18. A lighting device as in claim 17, wherein the mount substantially and closely encapsulates the circuit board.

19. A circular saw comprising:
   a saw unit having a circular saw blade and a handle;
   a fluorescent lamp coupled to the handle via a flexible support, the flexible support having a longitudinal axis, wherein a first end of the flexible support is coupled to the handle, and a second end of the flexible support is coupled to the fluorescent lamp, the flexible support being bendable along the longitudinal axis, so that the fluorescent lamp can be positioned in any desired position relative to the saw unit; and
   an electrical circuit constructed and arranged for lighting the fluorescent lamp, the electric circuit including means for generating a relatively high frequency alternating current.

20. A circular saw as in claim 19, wherein the flexible support has a hollow tubular configuration that defines an inner space and the electrical circuit is electrically coupled to the fluorescent lamp via the inner space.

21. A circular saw as in claim 19, further comprising a mount coupling the first end of the flexible support to the handle and the electrical circuit is defined within a circuit board that is attached to the mount.

22. A circular saw as in claim 19, further including a table that supports the saw unit, wherein the saw unit can move toward and away from the table and the saw unit can incline relative to the table so as to vary an inclination angle of the circular saw blade relative to a workpiece supported by the table, the flexible support being arranged and constructed to illuminate either side of the saw blade and a portion of the workpiece that is being cut by the saw blade.

23. A circular saw as in claim 19, further comprising a mount that couples to the first end of the flexible support to the handle, wherein the electrical circuit is defined within a circuit board that is disposed on the mount.

24. A circular saw as in claim 23, wherein the handle is arranged and constructed to be grasped by an operator during a cutting operation, the mount being attached to the handle, and the electrical circuit further includes a lighting switch, wherein an operator can turn the lighting switch ON and OFF while grasping the handle during a cutting operation.

25. A circular saw as in claim 24, wherein the mount defines a substantially closed space, and the circuit board is disposed within the substantially closed space.

26. A circular saw as in claim 25, wherein the flexible support has a hollow tubular configuration that defines an inner space, wherein the circuit board is electrically coupled to the fluorescent lamp via the inner space.

* * * * *